(12) United States Patent
Wehner et al.

(10) Patent No.: US 7,051,981 B2
(45) Date of Patent: May 30, 2006

(54) METHOD FOR ALIGNING A SPACECRAFT

(75) Inventors: James W. Wehner, Torrance, CA (US); Christian M. Harris, Manhattan Beach, CA (US); Michael K. O'Rell, Manhattan Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 24 days.

(21) Appl. No.: 11/044,308

(22) Filed: Jan. 27, 2005

(65) Prior Publication Data

US 2005/0263647 A1    Dec. 1, 2005

Related U.S. Application Data

(62) Division of application No. 10/346,888, filed on Jan. 17, 2003, now Pat. No. 6,921,050.

(51) Int. Cl.
*B64G 1/36* (2006.01)

(52) U.S. Cl. ..................................... 244/168
(58) Field of Classification Search ............... 244/168, 244/173, 158 R, 171; 136/292, 244, 245, 136/246
See application file for complete search history.

(56) References Cited

U.S. PATENT DOCUMENTS

| | | | | |
|---|---|---|---|---|
| 4,174,978 A * | 11/1979 | Lidorenko et al. | ........... | 136/246 |
| 4,345,728 A * | 8/1982 | Neufeld | ........................ | 244/168 |
| 4,379,944 A * | 4/1983 | Borden et al. | ............... | 136/259 |
| 4,684,084 A * | 8/1987 | Fuldner et al. | .............. | 244/168 |
| 4,759,517 A * | 7/1988 | Clark | ........................... | 244/168 |
| 4,800,868 A * | 1/1989 | Appeldorn et al. | .......... | 126/692 |
| 5,697,582 A * | 12/1997 | Surauer et al. | .............. | 244/168 |
| 5,850,992 A * | 12/1998 | Flament et al. | .............. | 244/168 |
| 6,043,425 A * | 3/2000 | Assad | .......................... | 136/246 |
| 6,177,627 B1 * | 1/2001 | Murphy et al. | .............. | 136/246 |
| 6,189,835 B1 * | 2/2001 | Kaufman | ...................... | 244/168 |
| 6,670,540 B1 * | 12/2003 | Kular | ........................... | 136/245 |

* cited by examiner

Primary Examiner—Tien Dinh
(74) Attorney, Agent, or Firm—John A. Miller; Warn, Hoffmann, Miller & LaLone, P.C.

(57) ABSTRACT

Controlling the solar torque imposed on a spacecraft (10) in flight by providing a film (52) with variable absorptive, reflective, emissive and/or transmissive properties on the sun side of a thermal shield (50) of the spacecraft (10). As the orientation of the thermal shield (50) changes relative to the sun line, the absorptive, reflective, emissive and/or transmissive properties of the shield (50) change to cause the shield's (50) center of solar pressure to change, thus aligning it with the spacecraft (10) center of mass (24) as viewed from the direction of the sun line. In accordance with another embodiment of the invention, the spacecraft (100) is provided with a plurality of control vanes (110–116) that have a variable absorptive, transmissive, reflective and emissive property to maintain the spacecraft (100) stably pointed towards the sun.

20 Claims, 5 Drawing Sheets

METHOD FOR ALIGNING A SPACECRAFT

CROSS-REFERENCE TO RELATED APPLICATIONS

This application is a divisional application of U.S. patent application Ser. No. 10/346,888 filed Jan. 17, 2003 now U.S. Pat. No. 6,921,050, titled "Solar Torque Control Using Thin Film Directionally Reflective, Emissive, Absorptive and Transmissive Surfaces."

BACKGROUND OF THE INVENTION

1. Field of the Invention

This invention relates generally to a method for controlling the solar torque on a spacecraft and, more particularly, to a method for controlling the solar torque on a spacecraft using a directionally reflecting, emitting, absorbing and transmitting surface.

2. Discussion of the Related Art

When a spacecraft is in space, a variety of environmental disturbances, including solar pressure, gravity-gradient, magnetic and aerodynamic effects, act on the spacecraft producing forces and torques. These forces and torques vary depending on the spacecraft's orbital altitude. If the spacecraft is in a low Earth orbit (LEO), the forces and torques other than solar pressure are typically dominant because they vary inversely with orbital radius. If the spacecraft is in a high altitude orbit, such as a geosyncronous Earth orbit (GEO), the dominant disturbance is solar pressure. This discussion deals with solar torque. The article, Harris, Christian M. et al, "Effect of Thermal Radiation Torques on the TDRS Spacecraft," *American Institute of Aeronautics and Astronautics, Inc.,* 1990, pgs. 1602–1614 also provides a discussion of solar torque on a spacecraft.

Various spacecraft, such as the next generation space telescope (NGST), the terrestrial planet finder (TPF) and the planet imager (PI), require sun shades that can be extremely large in order to protect cryogenic instruments mounted on the spacecraft. These large sunshades are typically opaque and receive large amounts of incident solar radiation, and thus may increase the solar torque on the spacecraft. Spacecraft systems of this type are typically designed to point off-angle from the sun, usually within a 45° "anti-sun" conical region. If the center of pressure (CP) of the incident solar radiation is co-incident with the spacecraft center of mass (CM), then little or no solar torque is produced. However, typical spacecraft designs preclude co-locating the center of pressure and the center of mass because of mission payload configuration constraints.

FIG. 1 is a simple schematic of a spacecraft 10, such as the TPF or NGST, used to illustrate how solar pressure produces spacecraft disturbance torque. The spacecraft 10 includes a bus 12 positioned on one side of a thermal shield assembly 14, and sensor optics 16 positioned on the opposite side of the thermal shield assembly 14. The bus 12 houses the spacecraft avionics subsystems and is typically on the "sun side" of the assembly 14. The thermal shield assembly 14 includes a multi-layer insulation (MLI) 18 on the bus side of the assembly 14, and a series of angled specular shields 20 that act to reflect light and heat away from the sensor optics 16. In one design, the optics 16 are on the order of two meters, and the shields 20 are on the order of 10 meters.

Based on the spacecraft schematic shown in FIG. 1, a simplified schematic of the center of mass 24 and the center of pressure 26 of the spacecraft 10 relative to a solar shield 28 as shown in FIG. 2. The solar shield 28 represents the thermal shield assembly 14. Typically, the spacecraft center of mass 24 is on the bus side of the thermal shield 28, and the center of pressure 26 is at the geometric center of the thermal shield 28.

FIG. 3 utilizes the schematic shown in FIG. 2 to depict the forces generated by solar radiation pressure that impinges normal to the shield 28 and the resultant thermal radiation from the shield 28. Incident photons 30 can be either absorbed, specularly reflected at 32 in a mirror like manner, or can be reflected in a diffuse manner at 34, sometimes referred to as a Lambertian distribution. The absorbed energy must be emitted as thermal radiation energy with the bulk of the thermal emission occurring from the sun side due to the insulation effectiveness. This emitted thermal energy also typically has a Lambertian energy distribution 35. The resultant force vector due to the reradiated thermal energy is shown at 43. Thus, there a re four force vectors caused by the impinging photons 30, including a force vector 40 from the absorption of the incident photons 30, a force vector 38 from the specularly reflected photons, and force vector 42 from the diffusely reflected photons and the force vector 43 from thermal radiation. The momentum from the specularly reflected photons is twice as much as the momentum of the absorbed photons. The combination of the force vectors 38–43 gives an effective force vector 44. For this depiction, the sunlight is aligned along an axis running through the CM 24 and the CP 26, where the effective force vector 44 is along this axis. Therefore, the resultant force vectors are the same at both sides of the shield 28, resulting in no net torque being imposed on the spacecraft 10.

For typical sunshield designs, most of the incident light energy is reflected or absorbed and re-emitted from the shield 28 at the side facing the sun. The thermal insulating nature of the thermal shield 28 reduces heat leakage to one or two percent of the total incident front side energy. Therefore, backside thermal radiation is negligible due to the effectiveness of the thermal shield 28. In a situation where the CM 24 and the CP 26 are co-aligned relative to the direction of the incident sunlight, there is no net induced torque on the spacecraft 10.

The force on a surface due to photon absorption, i.e., the force due to solar radiation pressure, is given by:

$$F_{absorbed} = SA/c, \tag{1}$$

where $F_{absorbed}$ is the absorption force, S is solar flux (power per unit area), A is the projected area, and c is the speed of light. For a specular surface, the angle of incidence of the impinging photons equals the angle of reflection of the reflected photons, resulting in a force opposite to the surface normal vector direction. Thus, when the incident surface is totally specularly reflective, and the surface is normal to the sun vector, the specular reflection force ($F_{reflection\ specular}$) is given by $F_{reflection\ specular} = 2SA/C$. A diffusely reflective surface, i.e., Lambertian distribution, produces a force given by:

$$F_{reflection\ diffues} = 2SA/3c. \tag{2}$$

Emitted photons also result in forces opposite to the direction of travel of the emitted photon.

For most spacecraft functions, the pointing direction of the optics, and thus the pointing direction of the entire spacecraft, will be in such a direction that the incident solar radiation is angled relative to the axis through the CM 24 and the CP 26. FIG. 4 is a representation of the schematic shown in FIG. 3 where the shield 28 is angled relative to the incident solar radiation, and the CM 24 is thus tilted to the left. Each of the force vectors generated by the incident, reflected and radiated photons identified in FIG. 3 are shown in FIG. 4. However, the direction of the reflected and emitted radiation is different, and therefore the effective force vector 44 is not aligned with the CM 24 and CP 26 axis. Because the effective force vector 44 is not aligned along the axis between the CM 24 and CP 26, a torque is created about the CM 24 identified by a moment 46 in the clockwise direction.

The net torque T produced by a single surface about the spacecraft 10 body axes is then:

$$T = L_{CP\text{-}CM} X (F_{absorbed\ radiation} + F_{reflected\ radiation} + F_{emitted\ radiation}) \quad (3)$$

where $L_{CP\text{-}CM}$ is the position vector from the center of mass 24 to the surface center of pressure 26. For the spacecraft, the total magnitude of the generated torque T can be determined by an area integration of the cross-product of the local force vector and the respective CP/CM moment arm of the localized surface area elements, dA, given as:

$$T = \int_A \vec{L}(\theta, r, \phi) x d\vec{F} = \int_A \vec{L}(\theta, r, \phi) x \vec{f}(\theta, r, \phi, \Phi_s) dA \quad (4)$$

where $\theta$, $r$, $\phi$ are the spherical coordinates in body-axes and $\Phi_s$ is the angle of incident sun.

Various techniques are known in the art to compensate for solar torques. One of these includes employing torque compensating reaction wheels (one wheel is provided for each spacecraft body axis) that provide spacecraft attitude control. As the solar torque acts on the spacecraft, one or more of the wheels is accelerated to compensate for the solar pressure disturbance torque resulting in wheel momentum accumulation. Periodically, it is necessary to unload momentum from the reaction wheels to prevent saturation.

Suitable momentum unloading compensation can be performed by magnetic torquers if the spacecraft is in a low Earth orbit, where the Earth's magnetic field strength is sufficiently large to produce appreciable magnetic torques. In this situation, a magnetic dipole is generated using onboard magnetic torque rods that interact with the Earth's magnetic field to produce a torque. However, as the spacecraft orbital altitude gets farther from the Earth, the Earth's magnetic field strength reduces rapidly, thus reducing the ability to provide this type of momentum unloading. For high orbit altitudes where momentum unloading cannot be provided by Earth's magnetic field, typically the spacecraft thrusters are used to provide momentum unloading of the wheels. However, spacecraft weight is an important design consideration, and therefore, thrusters firing should be minimized in order to reduce on board propellant requirements.

Some spacecraft designs employ appendages (e.g., solar sails) to align the spacecraft center of pressure with the spacecraft center of mass to reduce solar torques. Other possible approaches for mitigating solar torque include active devices such as moveable fins or electrochromic surfaces. However, these types of devices are typically expensive and heavy, and are generally unproven and have a limited reliability. A simple, low cost approach to mitigating the effects of solar torque on spacecraft which have large surface areas, is thus needed.

When a spacecraft failure occurs, the onboard computers typically direct the spacecraft to a sun-pointing safe-hold attitude. Sun-pointing provides power with proper solar array orientation, and by design provides a benign or low torque, stable thermal environment. The spacecraft can typically remain in this orientation indefinitely while ground based diagnostics examine telemetry and implement failure work arounds. Typically, reaction wheels are shut down, and the spacecraft thrusters are used to orient the spacecraft to maintain the sun-pointing direction.

Various systems are known in the art for accumulating and unloading angular momentum, as well as for directing the spacecraft to the sun-pointing direction. However, these systems are typically complicated and expensive. What is also needed is a passive method of reducing solar induced torque and achieving and maintaining sun-pointing.

SUMMARY OF THE INVENTION

In accordance with the teachings of the present invention, the solar torque on a spacecraft in flight is controlled by providing a film on the sun side of the thermal shield that has variable absorptive, reflective, emissive and transmissive properties. As the sun incidence angle changes, the absorptive, reflective, emissive and transmissive properties of the thermal shield change (as viewed from the sun line) to cause the center of pressure to shift relative to the shield, so as to align it with the center of mass of the spacecraft.

In one embodiment, the film is partitioned into "pie-shaped" sections where each section has an embossed grid formed on an insulation layer. The grid includes elongated, triangular-shaped segments facing towards a center line of the shield. The embossed grid has ridges containing a long, near flat side formed with a white or reflective material and a short, near vertical side formed with a black or absorptive material. As the thermal shield is angled relative to the incident solar radiation, either the reflective portion or absorptive portion of the embossed grid segments become more exposed to sunlight depending on the location of the segments on the shield, thus changing the center of solar pressure in a desirable manner.

According to another embodiment of the invention, the spacecraft is provided with thermal control vanes that have variable absorptive, reflective, emissive and transmissive properties to provide a torque on the spacecraft to maintain it in a sun-pointed orientation in the event of system failure. The thermal control vanes can also employ embossed segments having similar characteristics, where the long side of each embossed segment is reflective and the short side of each embossed segment is absorptive. The embossed film is formed on opposite sides of the control vane, where the film is oriented in opposite directions to provide the pointing control. The plurality of control vanes includes x-axis and y-axis control vanes to provide control torques about both the x and y-axes. The control vanes can be attached to the solar arrays of the spacecraft.

Additional advantages and features of the present invention will become apparent to those skilled in the art from the following discussion and the accompanying drawings and claims.

DETAILED DESCRIPTION OF THE EMBODIMENTS

The following discussion of the embodiments of the invention directed to providing a directionally reflectance surface on a spacecraft for controlling solar torque or spacecraft pointing is merely exemplary in nature, and is in no way intended to limit the invention or its applications or uses.

Figure 5A:
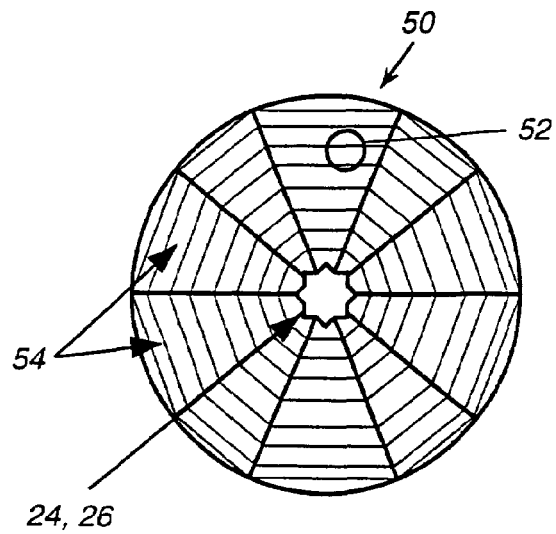
FIGS. 5(a)–5(b) are sun side views of a thermal shield of a spacecraft positioned in a normal direction and an angled direction relative to the direction of the solar radiation, respectively, including directionally reflective segments on the shield, according to an embodiment of the present invention.
Figure 5B:
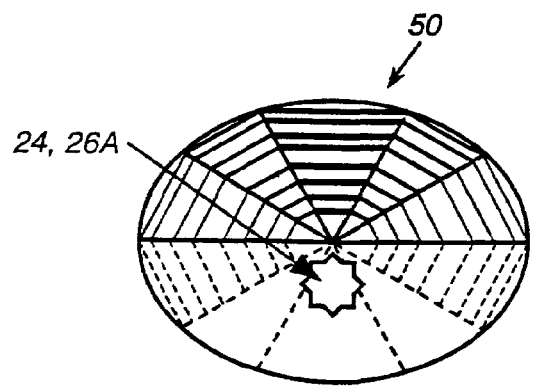

FIGS. 5(a)–5(b) show a sun side view of a thermal shield 50 for a spacecraft. The shield 50 is shaped like a disc in this embodiment, but as will be appreciated by those skilled in the art, can have other suitable shapes. FIG. 5(a) shows the shield 50 in an orientation normal to the incident sunlight, where the CM 24 and the CP 26 are aligned with the direction of the incident sunlight, and FIG. 5(b) shows the shield 50 angled relative to the direction of the incident sunlight. In FIG. 5(b), the shield 50 has been rotated about the CM 24 such that the top half of the shield 50 is angled forward (i.e., out of page) and the bottom half of the shield 50 is angled backwards (i.e., into page) so that the shield area centroid (as viewed from the sun line) is tilted upward. Thus, in order for there to be no solar torque on the shield 50 in the angled configuration, the "effective" center of solar pressure 26A must move downward to be aligned with the spacecraft center of mass 24. This shift in "effective" CP location is caused by the imbalanced optical properties of an embossed grid as viewed from the sun line direction.

In accordance with the teachings of the present invention, the shield 50 is provided with a directionally absorptive and reflective layer 52 on its sun side. In one embodiment, the layer 52 is made of Polytetrafluoroethylene (PTFE), or other suitable material consistent with the discussion herein, and has a thickness on the order of 5 mils. As will be discussed below, the layer 52 changes color in shades of black and white as the shield 50 changes its orientation relative to the direction of the sunlight, so that the reflection, absorption and emission of photons of the shield 50 is changed in a desirable manner. In other words, as the angle of the shield 50 changes relative to the direction of the sunlight, one side of the shield 50 appears darker and the opposite side of the shield appears lighter, so that the absorptive, reflective and emissive characteristics of the shield 50 change to move the "effective" center of pressure 26A in a desirable way (i.e., in alignment with S/C center of mass).

To accomplish the desired results, as the shield area centroid 26 shifts away from the center of mass 24, the side of the shield 50 on which the spacecraft center of mass 24 lies should become more reflective and the opposite side should become more absorptive, thus effectively shifting the shield's center of pressure towards the S/C center of mass. As discussed above, a specularly reflected photon imparts twice as much momentum on the spacecraft 10 as an absorbed photon. Thus, by making the side of the shield 50 angled away from the sun lighter or more reflective, and making the side of the shield 50 angled towards the sun darker or more absorptive, more pressure is provided at the light side than the dark side, and the effective center of pressure 26A shifts towards the center of mass 24 accordingly. By designing the absorptive, reflective and emissive characteristics of the shield 50 in a desirable manner, the effective center of pressure 26A will remain approximately co-aligned with the center of mass 24, so that minimal solar torque is imparted on the spacecraft. The directionally reflective layer 52 need not totally cancel the solar torque, but can reduce the solar torque to levels where residuals can be readily handled by standard momentum storage devices such as reaction wheels with periodic momentum unloading required.

Many materials and structural configurations can be used that change the absorptive, reflective and emissive properties of the shield 50 relative to the sun incidence angle. While most spacecraft typically use opaque surfaces, some applications also exist where variable direction transmissive effects can also be used to generate solar torques. Of note, are the class of transparent inflatable RF reflectors. High transmissivity is desirable to minimize both torque and solar array shadowing. Directional modification of transmissive properties can also serve to generate counter balancing torques.

The present invention contemplates providing any such materials or configurations that are suitable for a thermal shield or deployable panel/membrane on a spacecraft. These various materials include holographic materials and diffraction gratings providing the various absorptive, emissive, reflective and transmissive characteristics.

Figure 6:
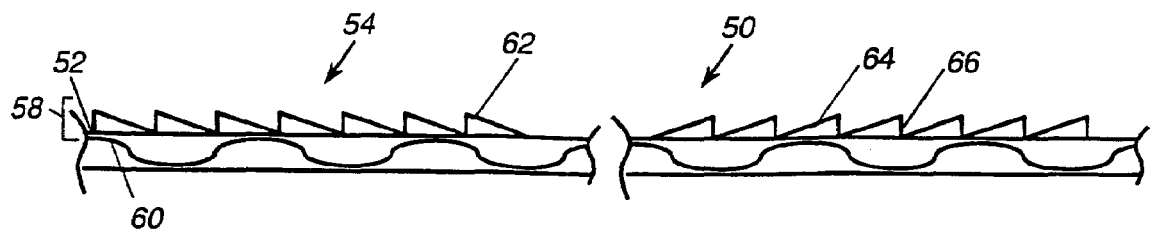
FIG. 6 is a broken away cross-sectional view of the thermal shield shown in FIG. 5 showing an embossed film with a directionally reflective grid of grooved surfaces, according to an embodiment of the present invention.

In the design depicted here, the shield 50 is partitioned into a plurality of "pie-shaped" sections 54, where each section 54 includes an embossed surface 58 formed on an MLI layer 60. FIG. 6 is a broken away, cross-sectional view of the shield 50 showing the embossed surface 58. The embossed surface 58 includes elongated, triangular-shaped ridges 62 where a near flat long side 64 of the ridges 62 face towards a center line of the shield 50, and a near vertical short side 66 of the ridges 62 faces away from the center line. The long side 64 of each ridge 62 is formed with a white or reflective material and the short side 66 of each ridge 62 is formed with a black or absorptive material. In one embodiment, the layer 52 is a plastic layer that is embossed to form the ridges 58, and the sides 64 are metallized with an aluminum layer by vacuum deposition. In one embodiment, the reflectance and absorption characteristics of the layer 52 are cosine dependent.

In FIG. 5(b), the shield 50 has been rotated about its diameter line such that the top half of the shield 50 is angled forward (i.e., out-of-page) and the bottom half of the shield 50 is angled away (i.e., into page) so that the short sides 66 on the top half become more exposed to sunlight, and the long sides 64 on the bottom half become more exposed to sunlight. This imbalance causes the effective center of pressure 26A to move towards the spacecraft center of mass 24, which nulls the solar torque. The use of the separate sections 54 allows the shield 50 to have any orientation toward the solar vector, i.e., the spacecraft 10 can rotate about the sun line, and still be able to balance the solar torque.

The embossed thin film approach discussed above was selected as a primary candidate for varying the reflective and emissive characteristics of the shield 50 for several reasons. These reasons include easy, low cost fabrication techniques, variable angled grooves in the same embossed film can allow for directional tailoring of optical properties versus offset angle, variable areas with similar characteristics can be pieced together at different angles, i.e., into a mosaic, to also allow the tailoring of optical properties versus offset angle to meet mission specific requirements, and the film can be fabricated using space stable, flight proven materials. However, it is stressed that other types of surfaces can be used on the thermal shield 50 to provide controlled reflectance and emissive properties, consistent with the discussion herein, as long as the film of the shield 50 can be designed so that the effective force vector 44 is maintained through the center of mass 24 by varying the absorptive/reflective/transmissive/emissive shield characteristics as a function of solar offset angle.

A simplified estimate of the magnitude of the differential torque T can be generated by assuming an insulated disk normal to the solar vector, with one half black and the other white (100% specularly reflective). The differential torque T is then given by:

$$T = L_{CPwhite-CM} \times (F_{absorbed-white} + F_{reflected-white} + F_{emitted\ white}) - L_{CPblack-CM} \times (F_{absorbed-black} + F_{reflected-black} + F_{emitted\ black}) = xL_{CPwhite-cm}(0 + 2SA_{white}/c + 0) \eta - xL_{CPblack-CM}, (SA_{black}/c + 0 + 2SA_{black}/3c\eta)$$  (5)

and if the CM 24 is in the plane of the disk and $A_{black} = A_{white} = A\ disc/2$, then:

$$|T| = (SA_{disc}/6c)L_{CPblack/white-CM}$$

where $L_{CPblack/white-CM}$=distance from CM24 to area centroid of each half-disk (i.e., $A_{black}$, $A_{white}$)=$4R_{disc}/3\eta$ where $R_{disk}$ is the radius of the disc.

Equation (5) assumes that the reflected and emitted energies are directed back towards the direction of incident solar radiation and neglects thermal radiation due to energy from other sources.

Figure 7:
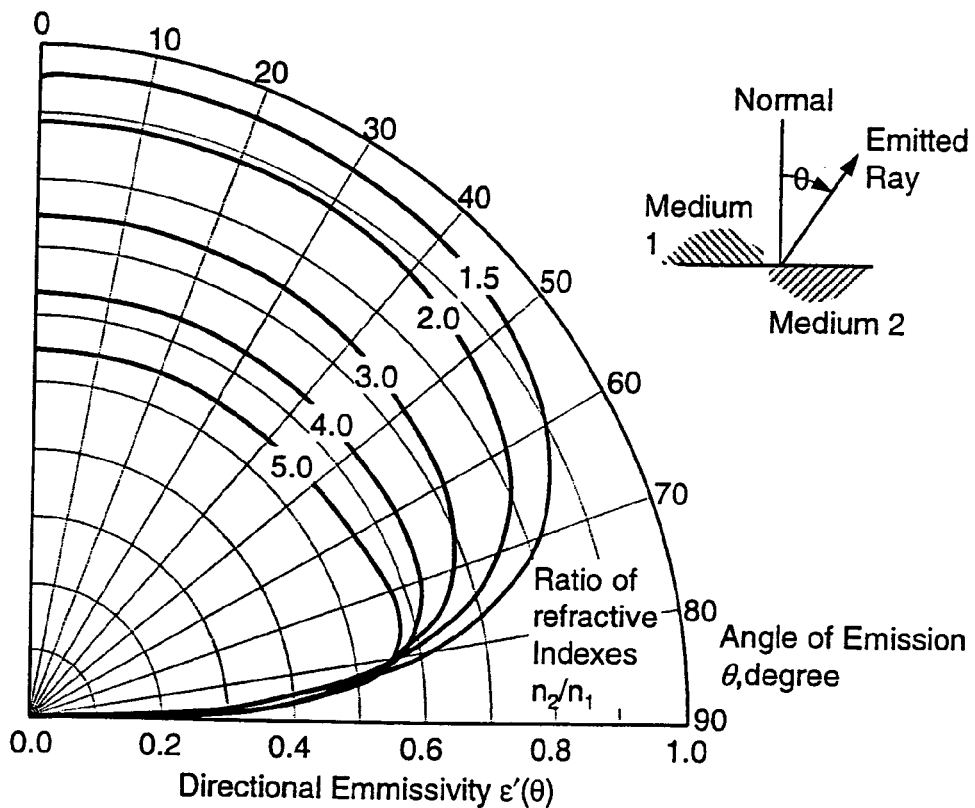
FIG. 7 is a graph showing the directional emittance characteristics for uniform opaque material.

FIG. 7 is a graph with directional emissivity $\epsilon$ relative to angle of emission $\theta$ that shows the directional emittance characteristics for uniform opaque materials. This type of diagram is typically referred to as a Lambertian distribution diagram, as these emission characteristics follow a near cosine distribution.

Figure 8:
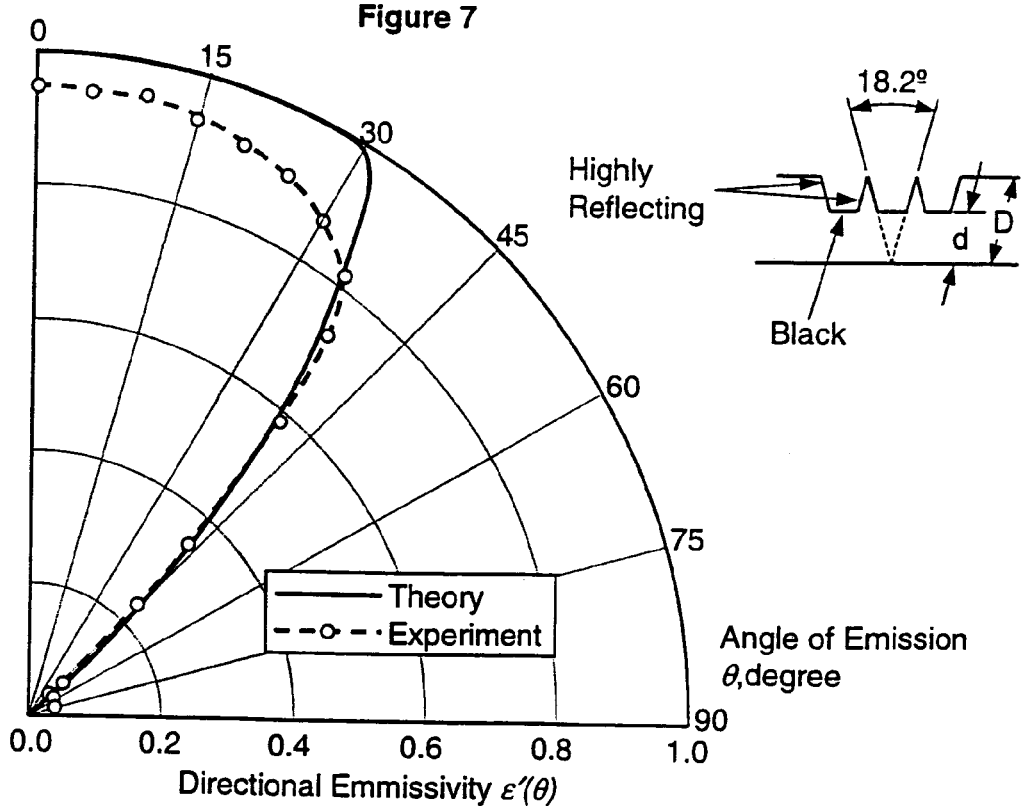
FIG. 8 is a graph showing the directional emittance characteristics for grooved surfaces.

FIG. 8 is also a graph with directional emissivity $\epsilon$ relative to angle of emission $\theta$ showing directional emittance characteristics for grooved surfaces. These diagrams show that it is in fact possible to change the reflective, absorptive, and emissive characteristics of a material, and with appropriate design, to operate in the manner discussed herein.

Figure 1:
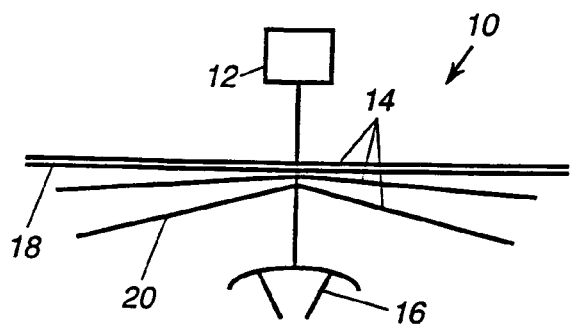
FIG. 1 is simple schematic diagram of a spacecraft.
Figure 2:
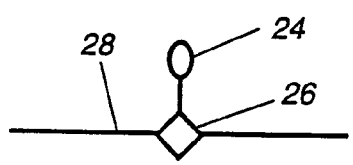
FIG. 2 is a schematic diagram of the spacecraft shown in FIG. 1 depicting the spacecraft center of mass and the shield's area centroid (i.e., same as center of solar pressure for a flat shield surface) on the spacecraft.
Figure 3:
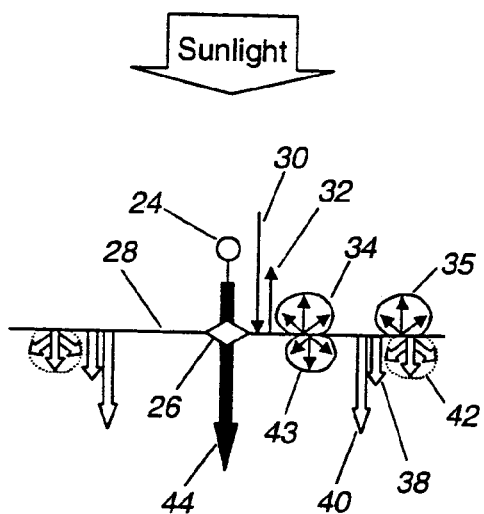
FIG. 3 is the schematic diagram shown in FIG. 2 depicting the forces on a thermal shield of the spacecraft where the solar radiation is normal to the shield.
Figure 4:
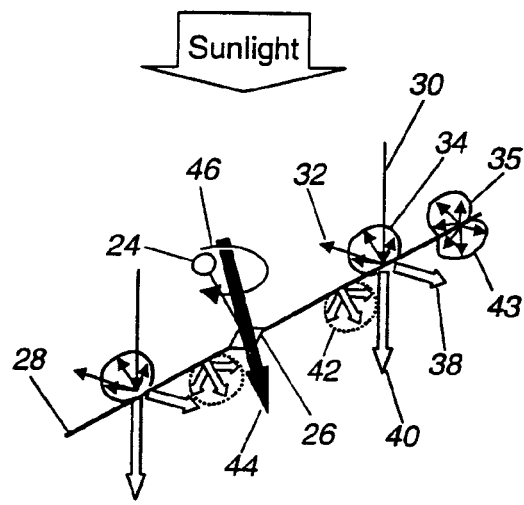
FIG. 4 is the schematic diagram of the spacecraft shown in FIG. 2 depicting the forces and resultant torque on the thermal shield of the spacecraft where the solar radiation impinges on the thermal shield at an angle.
Figure 9:
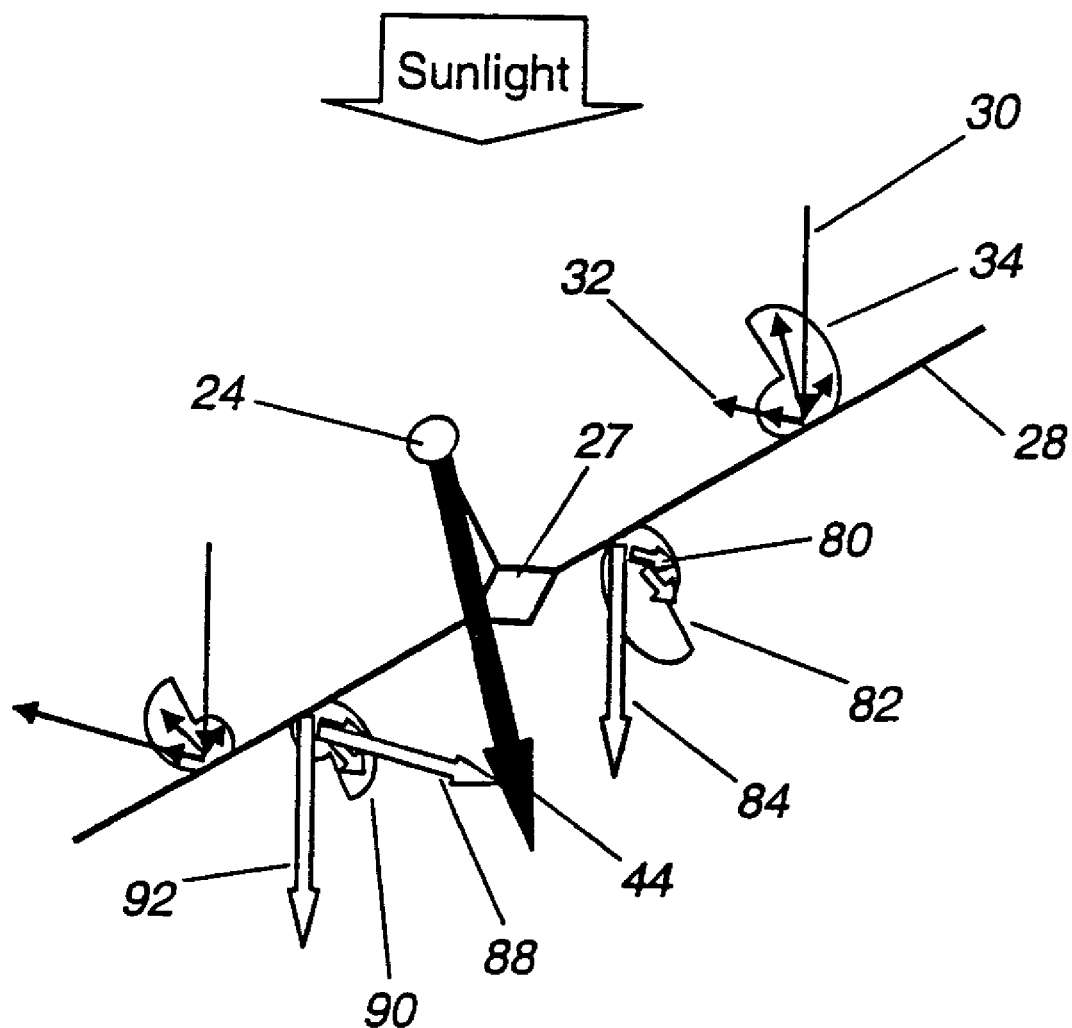
FIG. 9 is the schematic diagram shown in FIG. 4 for a thermal shield employing the reflectance and emittance properties of the present invention.

FIG. 9 is a force diagram of the type shown in FIG. 4 that depicts the emissive, reflective and absorptive characteristics of the layer 52. The geometric center of the thermal shield (27) is now offset from the center of pressure. The change in the absorptive, reflective and emissive characteristics of the shield 28 as the angle of the sunlight changes relative to the shield 28, changes the combinal force vector (44) in a desirable manner aligning it through the center of mass 24. Particularly, the specularly reflected photons on one side of the shield 28 produce larger forces than those on the other side. Also, the Lambertian emission on one side of the shield 28 is greater than the Lambertian emission on the opposite side of the shield 28 as a result of the change in the absorptive and emissive characteristics. This has the desirable effect of changing the resultant force vectors so that the effective force vector 44 is maintained through the spacecraft center of mass 24.

Force vector 80 represents a decreased reflective force vector due to high solar absorption, force vectors 82 represent an increased radiative force vector due to high solar absorption and thermal reradiation, with non-Lambertian directional distribution. Force vector 84 represents the direct incident force vector on the sun side of the shield 28. On the other side of the shield 28, the force vector 88 represents an increased reflective force vector due to low solar absorption, and the force vectors 90 represent a decreased radiative force vector due to low solar absorption and thermal re-radiation, with non-Lambertian distribution. Force vector 92 represents the direct incident force vector on the sun side of the shield 28. This gives rise to the net effective force vector 44 on the thermal shield 28.

A spacecraft can lose attitude control from system failures for a number of reasons. When this happens, it is generally desirable to orient the spacecraft to a safe-hold attitude where the solar arrays are pointed towards the sun. In this "safe mode", the reaction wheels are typically turned off to conserve power. Usually, sun sensors are used to get attitude measurements with respect to the sun line, and thrusters are used as control actuators to maintain this orientation. It would be desirable to provide a passive means for S/C attitude control to provide and maintain a sun-pointing orientation. The discussion above with respect to eliminating solar torque by passively controlling the shield's effective center of solar pressure 26A location with respect to the spacecraft center of mass 24 can be extended to passive attitude control for solar pointing purposes.

Figure 10:
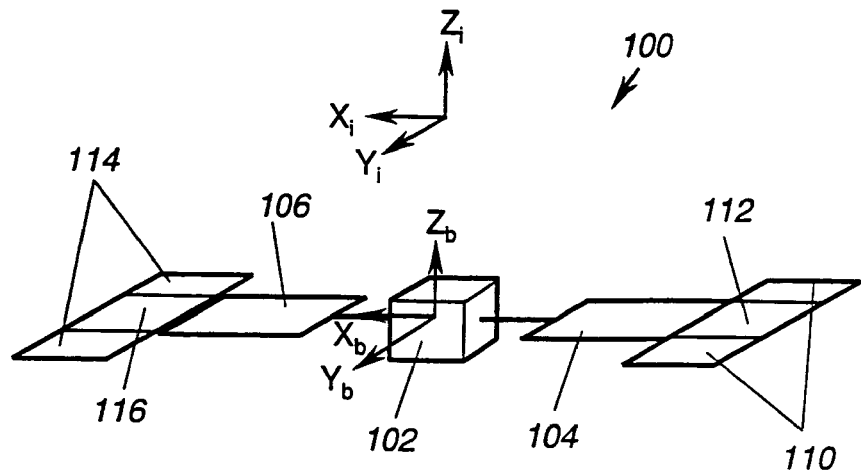
FIG. 10 is a simplified spacecraft schematic diagram including x-axis and y-axis solar torque control vanes to provide pointing control, according to another embodiment of the present invention.

FIG. 10 is a simplified schematic of a spacecraft 100 including a spacecraft bus 102 and solar arrays 104 and 106. The spacecraft body-axes are designated by the coordinate system $x_b$, $y_b$, $z_b$. The inertial orientation of the spacecraft 100 is shown relative to an $x_i$, $y_i$, and $z_i$-axis inertial coordinate system.

The spacecraft 100 further includes a plurality of solar torque control vanes extending from the arrays 104 and 106, including two $x_b$-axis control vanes 110 and a $y_b$-axis control vane 112 extending from the solar panel 104, and two $x_b$-axis control vanes 114 and a $y_b$-axis control vane 116 extending from the solar array 106. In one embodiment, the control vanes 110–116 are Kapton blankets covered with a directionally emissive and reflective film of the type discussed above. The use of the control vanes 110–116 at the ends of the solar arrays 104 and 106 is by way of a non-limiting example, in that the control vanes as discussed herein can be placed at other suitable locations on the spacecraft 100. For example, control surfaces can be formed on the spacecraft surfaces themselves.

Figure 11:
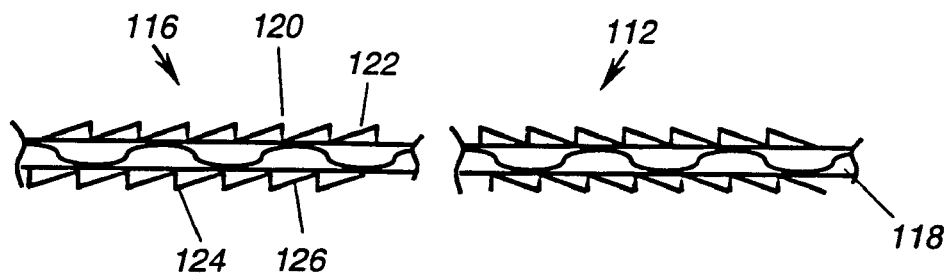
FIG. 11 is a broken-away cross-sectional view of one of the y-axis control vanes shown in FIG. 10.

FIG. 11 is a broken-away, cross-sectional view of the $y_b$-axis control vanes 112 and 116. The $x_b$-axis control vanes 110 and 114 would be similar to the $y_b$-axis control vanes 112 and 116, except they would be rotated by 90° relative to the $z_b$-axis. The control vanes 110–116 can be an embossed film on an multi-layer insulation blanket 118. In this embodiment, the control vanes 112 and 116 include an embossed film 120 including segments 122 on one side of the layer 118, and an embossed film 124 including segments 126 on the other side of the layer 118. As above, the long side of each segment 122 and 126 is formed with a white or reflective material and the short side of each segment 122 and 126 is formed with a black or absorptive material.

In this embodiment, the orientation of the films 120 and 124 are opposite to each other, as shown. Particularly, the film 120 is oriented on the control vanes 112 and 116 so that the short sides of the segments 122 oppose each other, and the film 124 is oriented on the control vanes 112 and 116 so that the long sides of the segments 126 oppose each other. As with the control surface on the thermal shield, different reflective materials and configurations can be used on the control vanes 110–116 to provide the desired reflectivity and emissivity characteristics.

Figure 12:
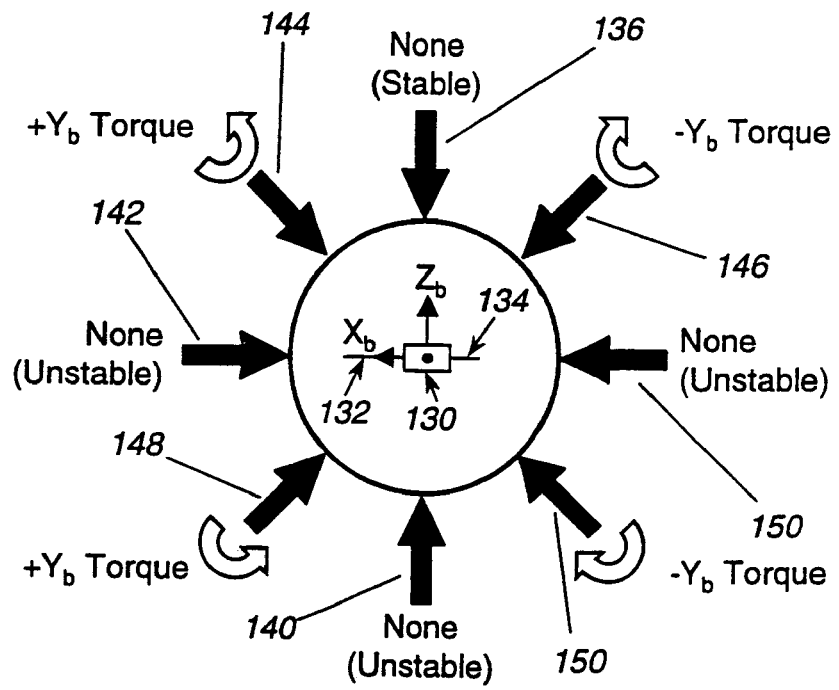
FIG. 12 is a stability diagram showing y-axis control torque polarities generated by the y-axis control vanes of the spacecraft shown in FIG. 10.

The orientation of the spacecraft 100 relative to the inertial coordinate system can be changed depending on the absorptivity, reflectivity and emissivity of the control vanes 110–116. FIG. 12 is a torque stability diagram for a spacecraft bus 130 and solar arrays 132 and 134 representing the spacecraft 100 above. If the spacecraft systems failed, it would typically be desirable to orient the spacecraft in the safe-hold attitude, where the solar arrays 132 and 134 would be pointed towards the sun line. The spacecraft bus 130 would be designed so that if the sun line was pointed towards the spacecraft bus 130 from the direction represented by arrow 136, a torque balanced configuration results which yields zero net solar torque on the spacecraft bus 130 which keeps the spacecraft bus 130 pointing towards the sun. If the sun line is directed along arrow 144, the control vanes on the $-x_b$ solar array wing would appear more reflective than those on the $+x_b$ solar array wing resulting in a stability control torque on the spacecraft bus 130 about its $y_b$-axis in the counter-clockwise direction. This in effect rotates the spacecraft $z_b$-axis back towards the sun line direction and causes the spacecraft bus 130 to rotate towards the equilibrium attitude (i.e., aligned with sun line). If the spacecraft bus 130 is pointed in a direction so that the sun line is aligned with arrow 146, the opposite effect occurs. In other words, the generated solar torque from small offset angles would tend to reorient the $z_b$-axis to the sun.

If the sun line is aligned with any direction of the arrows 138, 140, 142, 148 and 150, the spacecraft attitude is unstable, and the control vanes 110–116 will produce control torques which rotate the spacecraft bus 130 back to the stable equilibrium attitude in which the $z_b$-axis is aligned with the sun line (i.e., as identified by the arrow 136). Because the embossed film on the $-z_b$ side of the control vanes 110–116 is oriented opposite to the embossed film on the $+z_b$ side of the control vanes 110–116, the opposite effect occurs when the sun line is coming from the directions 148 or 150 as for directions 144 or 146, causing the $z_b$-axis of the spacecraft bus 130 about to rotate back to the only stable direction (i.e., aligned with sun line). The $x_b$-axis control vanes 110 and 114 provide control torques about the S/C $x_b$-axis which causes rotation of the spacecraft bus 130 about the $x_b$-axis to align the $z_b$-axis with the sun line.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A method for aligning a spacecraft center of solar pressure with a spacecraft center of mass as viewed from the direction of the sun line, said method comprising:
   providing a control surface on the spacecraft; and
   varying the reflective, absorptive, emissive and/or transmissive characteristics of the control surface as a sun incidence angle changes so that the position of the spacecraft center of solar pressure changes as a function of the sun incidence angle.

2. The method according to claim 1 wherein providing a control surface includes providing a thermal control surface.

3. The method according to claim 2 wherein providing a control surface includes providing a thermal control surface that is a thermal shield.

4. The method according to claim 3 wherein providing a control surface includes providing a thermal shield that is circular and includes an axi-symmetric balancing of solar generated torques.

5. The method according to claim 3 wherein providing a control surface includes providing a thermal shield that is circular and that includes an outer layer that is formed by a plurality of pie-shaped sections, wherein each pie-shaped section includes the same variable absorptive, reflective and emissive property from an outer perimeter of the shield to the center of the shield.

6. The method according to claim 1 wherein providing a control surface includes providing a control surface that includes an embossed film formed by elongated triangular sections, wherein one side of each triangular section is absorptive and another side of each triangular section is reflective so that the orientation of the control surface relative to the incident solar radiation determines the absorptive, reflective, emissive and/or transmissive properties of the control surface.

7. The method according to claim 1 wherein providing a control surface includes providing a control surface including a plurality of pie-shaped sections, wherein each pie-shaped section includes the same variable reflective, absorptive, transmissive and emissive properties.

8. The method according to claim 1 wherein providing a control surface includes providing a control surface including an embossed film including ridges with an elongated triangular shaped cross-section, wherein the orientation of the control surface relative to the incidence solar radiation determines the effective absorptive, reflective, emissive and/or transmissive properties of the surface.

9. The method according to claim 1 wherein providing a control surface includes integrating the control surface with a thin film embossed outer layer on a multi-layer insulation.

10. The method according to claim 1 wherein providing a control surface includes integrating the control surface with a thermal shield of the spacecraft.

11. The method according to claim 1 wherein providing a control surface includes providing a control surface having a holographic thin film material.

12. The method according to claim 1 wherein providing a control surface includes providing a control surface having a diffraction grating.

13. The method according to claim 1 wherein providing a control surface includes providing a control surface having stacked multi-layer materials that form a directional interference pattern.

14. A method for pointing a spacecraft towards the sun, said method comprising:

providing at least one control vane on the spacecraft; and varying the absorptive, transmissive, reflective and emissive characteristics of the control vane as a function of sun incidence angle on the control vane so that a stabilizing control torque is induced on the spacecraft to maintain it in a sun-pointed orientation.

15. The method according to claim 14 wherein providing at least one control vane includes providing a plurality of control vanes that provide $x_b$ and $y_b$ axes corrective torques.

16. The method according to claim 14 wherein providing at least one control vane includes providing a plurality of control vanes as attachments to solar arrays of the spacecraft.

17. The method according to claim 14 wherein providing at least one thermal control vane includes providing a thermal control vane with an embossed outer layer on one side of the control vane and another embossed outer layer on the opposite side of the vane.

18. The method according to claim 17 wherein the embossed layers on opposite sides of the vane are oriented opposite to each other.

19. A method for aligning a spacecraft comprising:

providing a control surface on the spacecraft that includes an embossed film including segments having a short side and a long side, wherein the short side of each segment is absorptive and the long side of each segment is reflective; and changing the reflective, absorptive, emissive and/or transmissive characteristics of the control surface as the sun incidence angle changes so that the position of the spacecraft center of solar pressure changes as a function of the sun incidence angle.

20. The method according to claim 19 wherein the segments are elongated triangular sections.

* * * * *